United States Patent
Havilio et al.

(10) Patent No.: US 9,448,719 B2
(45) Date of Patent: Sep. 20, 2016

(54) TOUCH SENSITIVE DEVICE WITH PINCH-BASED EXPAND/COLLAPSE FUNCTION

(71) Applicant: Barnes & Noble College Booksellers, LLC, Basking Ridge, NJ (US)

(72) Inventors: Amir Mesguich Havilio, Palo Alto, CA (US); Gerald B. Cueto, San Jose, CA (US)

(73) Assignee: BARNES & NOBLE COLLEGE BOOKSELLERS, LLC, Basking Ridge, NJ (US)

( * ) Notice: Subject to any disclaimer, the term of this patent is extended or adjusted under 35 U.S.C. 154(b) by 254 days.

(21) Appl. No.: 13/715,297

(22) Filed: Dec. 14, 2012

(65) Prior Publication Data

US 2014/0173530 A1 Jun. 19, 2014

(51) Int. Cl.
*G06F 3/0488* (2013.01)
*G06F 3/0482* (2013.01)

(52) U.S. Cl.
CPC ......... *G06F 3/04883* (2013.01); *G06F 3/0482* (2013.01); *G06F 2203/04806* (2013.01); *G06F 2203/04808* (2013.01)

(58) Field of Classification Search
CPC ............... G06F 3/0482; G06F 3/0484; G06F 3/04842; G06F 3/0488; G06F 3/04817; G06F 3/017; G06F 3/01; G06F 3/048; G06F 3/04883; G06F 3/0481; G06F 2203/04807; H04L 41/22; H04N 5/2628
See application file for complete search history.

(56) References Cited

U.S. PATENT DOCUMENTS

| 4,896,543 A | 1/1990 | Gullman |
| 5,633,471 A | 5/1997 | Fukushima |
| 5,844,557 A | 12/1998 | Shively, II |

(Continued)

FOREIGN PATENT DOCUMENTS

EP 0722150 A1 7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Jeffrey A Gaffin
*Assistant Examiner* — Mandrita Brahmachari
(74) *Attorney, Agent, or Firm* — Finch & Maloney PLLC (57) ABSTRACT

Techniques are disclosed for expanding and collapsing content in electronic touch sensitive devices. The expand/collapse function can be used to navigate through content that may be displayed on a screen. The user can engage the function with a pinch-based gesture. In some cases, the UI feature includes a reading pane that displays a sample of the previously hidden detailed data relating to the content currently displayed on the screen. Background content outside the reading pane can be faded or otherwise softened. In some cases, the UI feature also includes, or alternatively includes, tap-expand feature that allows the user to select one or more items that are intended to be expanded or collapsed. Such a feature can include an initial single contact, followed by an inward or outward pinch with at least one additional contact point, in some example case.

20 Claims, 9 Drawing Sheets

(56) References Cited

U.S. PATENT DOCUMENTS

| | | | |
|---|---|---|---|
| 6,259,438 B1 | 7/2001 | Fleck et al. | |
| 6,956,564 B1 | 10/2005 | Williams | |
| 7,339,573 B2* | 3/2008 | Andert et al. | 345/157 |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E | 3/2013 | Williams | |
| 8,400,417 B2 | 3/2013 | Ording et al. | |
| 8,508,494 B2 | 8/2013 | Moore | |
| 2001/0025289 A1 | 9/2001 | Jenkins et al. | |
| 2002/0116421 A1 | 8/2002 | Fox et al. | |
| 2007/0047002 A1 | 3/2007 | Hull et al. | |
| 2008/0036747 A1 | 2/2008 | Hope | |
| 2010/0070523 A1* | 3/2010 | Delgo et al. | 707/769 |
| 2010/0088641 A1* | 4/2010 | Choi | 715/828 |
| 2010/0100854 A1 | 4/2010 | Russell et al. | |
| 2010/0134425 A1* | 6/2010 | Storrusten | G06F 3/0425 345/173 |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0309147 A1* | 12/2010 | Fleizach | G06F 3/04883 345/173 |
| 2010/0318895 A1 | 12/2010 | Steinberger et al. | |
| 2010/0325589 A1* | 12/2010 | Ofek et al. | 715/854 |
| 2011/0107197 A1* | 5/2011 | DeLuca | G06F 17/2247 715/234 |
| 2011/0138319 A1* | 6/2011 | Sidman | 715/781 |
| 2011/0175839 A1* | 7/2011 | Prabhu | G06F 3/04883 345/173 |
| 2011/0258542 A1 | 10/2011 | Kenney et al. | |
| 2012/0026077 A1* | 2/2012 | Hackborn | 345/156 |
| 2012/0056821 A1 | 3/2012 | Goh | |
| 2012/0127110 A1 | 5/2012 | Amm et al. | |
| 2012/0139879 A1 | 6/2012 | Kim et al. | |
| 2012/0159402 A1* | 6/2012 | Nurmi | G06F 3/04883 715/863 |
| 2012/0221938 A1 | 8/2012 | Patterson et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0280947 A1 | 11/2012 | Weaver et al. | |
| 2012/0284753 A1* | 11/2012 | Roberts | H04N 21/41407 725/45 |
| 2012/0311438 A1 | 12/2012 | Cranfill et al. | |
| 2012/0329529 A1 | 12/2012 | van der Raadt | |
| 2013/0016045 A1 | 1/2013 | Zhao et al. | |
| 2013/0036383 A1 | 2/2013 | Yuan et al. | |
| 2013/0063364 A1 | 3/2013 | Moore | |
| 2013/0067400 A1* | 3/2013 | Jitkoff et al. | 715/800 |
| 2013/0067420 A1* | 3/2013 | Pittappilly et al. | 715/863 |
| 2013/0073932 A1* | 3/2013 | Migos | G06F 15/0291 715/201 |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0113699 A1 | 5/2013 | Lim | |
| 2013/0120271 A1 | 5/2013 | Lee et al. | |
| 2013/0135234 A1 | 5/2013 | Hisano et al. | |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0185680 A1 | 7/2013 | Chaudhri et al. | |
| 2013/0194308 A1 | 8/2013 | Privault et al. | |
| 2014/0109012 A1* | 4/2014 | Choudhary | G06F 3/0483 715/838 |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

(56) References Cited

OTHER PUBLICATIONS

"Padblue 2,"—BRANDO—mobile.brando.com, http://mobile.brando.com/Padblue-2_p9162c1577d94.html., 4 pages, printed from the Internet on May 10, 2013.
Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.
"Bluetooth 4.0 SmartPen The future just got a little brighter," Pogo Connect, http://tenonedesign.com/connect.php, 7 pages, printed from the Internet on Jun. 20, 2013.
Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.
Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.
"Stylus Hanging Bluetooth Headset," BRANDO—mobile.brando.com, http://mobile.brando.com/prod_detail.php?prod_id=03291, 4 pages, printed from the Internet on May 10, 2013.
"The JukeStyle is a great budget stylus for your iOS devices," stylus Archives—iPad News, http://www.ipadnews.nl/tag/stylus/, 44 pages, printed from the Internet on Jun. 20, 2013.
Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.
Bragdon, et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", Google Mobile, www.google.com/mobile/gesture-search, 1 page, printed from the Internet on Dec. 26, 2012.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.
"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.
Kanai, et al., "Intra-Rendition Navigation," Copyright 2012-2013 International Digital Publishing Forum (IDPF), 13 pages.
"Explaining how the sPen tech works (and is very diff than other styluses), http://forum.xda-developers.com/showthread_php?t=," 1 page, printed from the Internet on Jan. 15, 2013.

* cited by examiner

TOUCH SENSITIVE DEVICE WITH PINCH-BASED EXPAND/COLLAPSE FUNCTION

FIELD OF THE DISCLOSURE

This disclosure relates to electronic display devices, and more particularly, to user interface techniques for interacting with touch sensitive devices.

BACKGROUND

Electronic display devices such as tablets, eReaders, mobile phones, smart phones, personal digital assistants (PDAs), and other such touch screen electronic display devices are commonly used for displaying consumable content. The content may be, for example, an eBook, an online article or blog, images, a movie or video, a map, just to name a few types. Such display devices are also useful for displaying a user interface that allows a user to interact with an application running on the device. The user interface may include, for example, one or more touch screen controls and/or one or more displayed labels that correspond to nearby hardware buttons. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor).

DETAILED DESCRIPTION

Techniques are disclosed for expanding and/or collapsing data in electronic touch sensitive devices, such as touch screen and track pad devices. The expand/collapse function may be associated with an outward or inward pinch gesture on the touch sensitive device and may be used to display previously hidden content or hide content that had been displayed. The user may expand or collapse content, for instance, to navigate through material in a table of contents or an index. More generally, this function may be useful for navigating any content that may be displayed or consumed through the electronic touch sensitive device. In some cases, the pinch gesture may be associated with a zoom-in or zoom-out function, as well as the expand/collapse function. In such an example case, the pinch gesture can zoom-in or zoom-out the content shown on the screen, and after a certain point (or in combination with another gesture or button) the pinch gesture may expand or collapse content on the screen. In some cases, the pinch gesture may also be associated with a tap-expand gesture that determines the center of zooming or expansion. In some cases, the expand function may be combined with a preview pane that displays a sample of the previously hidden content. The preview pane may be useful for determining whether the previously hidden content is the content desired by the user. In such an example, background content outside the preview pane can be faded or otherwise softened, if so desired.

General Overview

As previously explained, electronic display devices such as tablets, eReaders, and smart phones are commonly used for displaying user interfaces and consumable content. In some instances, the user might desire to navigate through content and/or view content that is not currently being displayed on the screen. For instance, the user might wish to search through a table of contents to find a desired section of a book or article, or the user might perform a text search and wish to navigate through the search results that were provided. While some electronic devices provide '+' or '−' user interface (UI) features that can be selected by the user to display hidden related content, there does not appear to be a user interface expand/collapse function that can be efficiently and intuitively implemented with touch-screen gestures by the user.

Thus, and in accordance with an embodiment of the present invention, techniques are provided for expanding and collapsing data in electronic touch sensitive devices. The expand/collapse function can be used, for example, to display or hide more detailed data relating to the originally displayed content. The content being navigated may be, for example, an index, an eBook with embedded sub-plots, an online article or blog or other browser-based content, images with embedded sub-images, a movie or video with embedded hidden content, or a folder or album or library that includes a number of files therein (such as pictures, songs, movies, and/or documents), just to name a few types. The expand/collapse function may also be used to navigate through search results and display additional content related to the specific search results, or collapse that additional content. For instance, if a user has searched for a particular text book, the current version and pricing can be displayed, and hidden older versions and pricing may be and expanded for viewing if so desired. In another example, if a user has searched for a particular text book, the current version and pricing can be displayed, and hidden supplementary products such as a corresponding study guide and/or flashcards may be and expanded for viewing if so desired. In another example, if a user has searched for a particular word or phrase within a page of text book, one occurrence of that word or phrase can be displayed, and hidden other occurrences on that page may be and expanded for viewing if so desired. In another example, if a user is viewing a list of contacts, she may expand a selected one or more of the contacts to get primary portion of that contact information therein (such as name and telephone), without having to leave that page and actually open the full contact listing(s). Numerous other example applications and uses will be appreciated in light of this disclosure.

The user can expand or collapse the content with a particular gesture that is associated with the expand/collapse function, such as an outward or inward pinch with two or more fingers, or a pinch with two or more fingers while holding down one of the device's control buttons. In a more general sense, any uniquely identifiable touch of a touch sensitive surface by the user can be used to engage the expand/collapse function. The uniqueness of the touch may be based, for example, on the particular location of the touch and/or the nature of the touch (e.g., expanding two contact points, tapping one point and then expanding two contact points, expanding two contact points with another button pressed, etc). Once engaged, the expand/collapse function assists the user in viewing and navigating the given content. In some cases, the expand/collapse feature includes a preview pane that displays a sample of the expanded content or the text surrounding a search result. Magnification can be provided if so desired, and background content outside the preview pane can be faded or otherwise softened from the user's view so as to further accentuate the content within the preview pane. In some example cases, the preview pane may stay engaged until the user either collapses it, or expands again to access the content being previewed. In other example cases, the preview pane may expire after a few moments (e.g. 3 to 5 seconds).

In some embodiments, the pinch gesture may be associated with the expand and collapse function as well as a zoom-in/out function, and both functions may be coordinated in a number of ways. In some example embodiments, the zoom function may be associated with a simple pinch gesture while the expand/collapse function is associated with a pinch gesture when a certain control feature or button is held, or vice versa. Alternatively, the zoom function may be associated with a two touch point pinch gesture while the expand/collapse function is associated with a three touch point pinch gesture, or vice versa. In other embodiments, the pinch gesture may zoom-in or zoom-out on the content currently displayed on the screen until that content reaches an upper or lower size limit or boundary. In such an example, when the content is enlarged (zoom-in) to the upper boundary size (e.g., font size 16 pt.), subsequent outward pinch gestures may be configured to expand previously hidden content. In a similar way, when the content is zoomed-out to the lower boundary size (e.g., font size 8 pt.), subsequent inward pinch gestures may be configured to collapse content, in such an example embodiment. The zoom can be achieved, for example, through magnification or an actual change in formatting (e.g., font size). In some embodiments, the pinch gesture may be combined with an initial tap, which can set the center of expansion. For instance, the user may tap a file or folder and then perform an outward pinch gesture, which may create a preview pane that shows a sample of the expanded content related to the file or folder initially selected.

In some embodiments, the techniques described herein may be implemented to navigate through content using, for example, an Internet browser, a file or folder browser, slideshows, or any content containing multiple levels of data. In other embodiments, the techniques described herein may be combined with drag-and-drop UI techniques, or other UI techniques to aid in navigating and organizing content.

Numerous uniquely identifiable engagement schemes that exploit a touch sensitive surface can be used as will be appreciated in light of this disclosure. Further note that any touch sensitive device (e.g., track pad, touch screen, or other touch sensitive surface, whether capacitive, resistive, acoustic or other touch detecting technology) may be used to detect the user contact, and the claimed invention is not intended to be limited to any particular type of touch sensitive technology, unless expressly stated.

Architecture

Figure 1A:
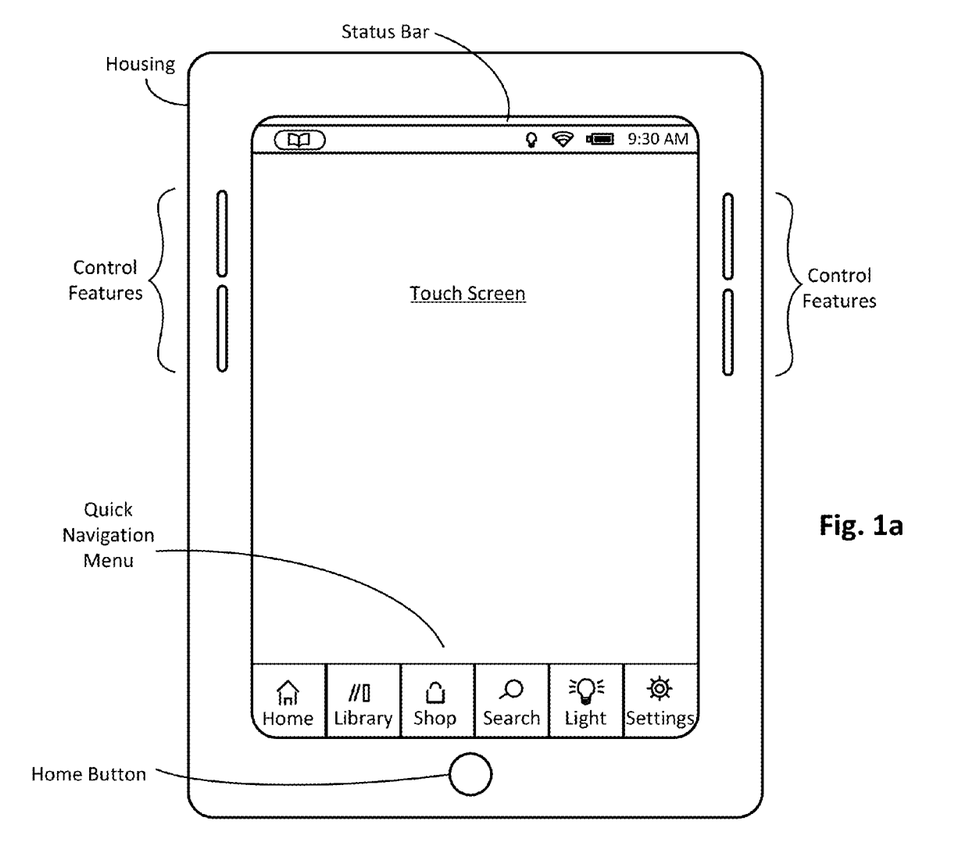
FIGS. 1a-b illustrate an example electronic touch sensitive device having an expand and collapse function, configured in accordance with an embodiment of the present invention.
Figure 1B:
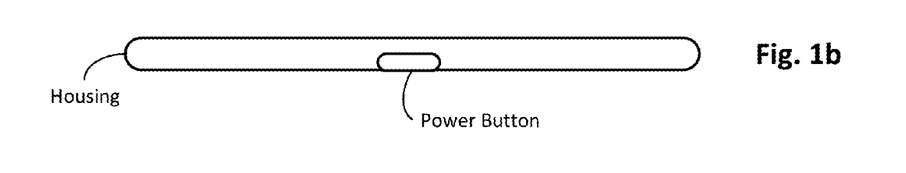

FIGS. 1a-b illustrate an example electronic touch sensitive device with an expand and collapse function configured in accordance with an embodiment of the present invention. The device could be, for example, a tablet such as the NOOK® by Barnes & Noble. In a more general sense, the device may be any electronic device having a touch sensitive user interface and capability for displaying content to a user, such as a mobile phone or mobile computing device such as an eReader, laptop, a desktop computing system, a television, a smart display screen, or any other device having a touch screen display or a non-touch display screen that can be used in conjunction with a touch sensitive surface. As will be appreciated in light of this disclosure, the claimed invention is not intended to be limited to any particular kind or type of electronic device.

As can be seen with this example configuration, the device comprises a housing that includes a number of hardware features such as a power button, control features, and a press-button (sometimes called a home button herein). A touch screen based user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI touch screen features, or different UI touch screen features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), which might be useful for an eReader application, for instance. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or features, or device form factor.

In this example configuration, the home button is a physical press-button that can be used as follows: when the device is awake and in use, tapping the button will display the quick navigation menu, which is a toolbar that provides quick access to various features of the device. The home button may also be configured to cease an active function that is currently executing on the device, such as a preview pane UI feature as described herein. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device was stowed into a bag or purse. Thus, one physical gesture may safely put the device to sleep. In such an example embodiment, the home button may be associated with and control different and unrelated actions: 1) show the quick navigation menu; 2) exit a preview pane UI feature mode; and 3) put the device to sleep.

As can be further seen, the status bar may also include a book icon (upper left corner). In some cases, tapping the book icon may provide bibliographic information on the content or provide the main menu or table of contents for the book, movie, playlist, or other content. In one such example case, for instance, the table of contents for a book is displayed, and the user may navigate the table of contents by expanding and collapsing the information according to the techniques disclosed herein.

In one example embodiment, the expand and collapse function described herein may be performed with an outward or inward pinch gesture on the touchscreen display or trackpad. In one such embodiment, the pinch gesture may be performed with two fingers (e.g., the index finger and thumb). The pinching gesture may also be associated with other functions, and these functions may be configured with a sub-menu specifically for configuring the pinch gesture. In one particular embodiment, a pinch gesture configuration sub-menu, such as the one shown in FIG. 1d, may be accessed by tapping or otherwise touching the Settings option in the quick navigation menu, which causes the device to display the general sub-menu shown in FIG. 1c. From this general sub-menu the user can select any one of a number of options, including one designated Screen/UI in this specific example case. Selecting this sub-menu item (with an appropriately placed screen tap) may cause the pinch gesture sub-menu of FIG. 1d to be displayed, in accordance with an embodiment. In other example embodiments, selecting the Screen/UI option may present the user with a number of additional sub-options, one of which may include a so-called pinch gesture option, which may then be selected by the user so as to cause the pinch gesture configuration sub-menu of FIG. 1d to be displayed. Any number of such menu schemes and nested hierarchies can be used, as will be appreciated in light of this disclosure. In other embodiments, the pinch-based expand and collapse function is hard-coded such that no configuration sub-menus are needed or otherwise provided (e.g., 2 or 3 finger pinch gesture for carrying out actions as described herein, with no user configuration).

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates the user touch in a given location into an electrical signal which is then received and processed by the underlying operating system (OS) and circuitry (processor, etc). Additional example details of the underlying OS and circuitry in accordance with some embodiments will be discussed in turn with reference to FIG. 2a.

Figure 1C:
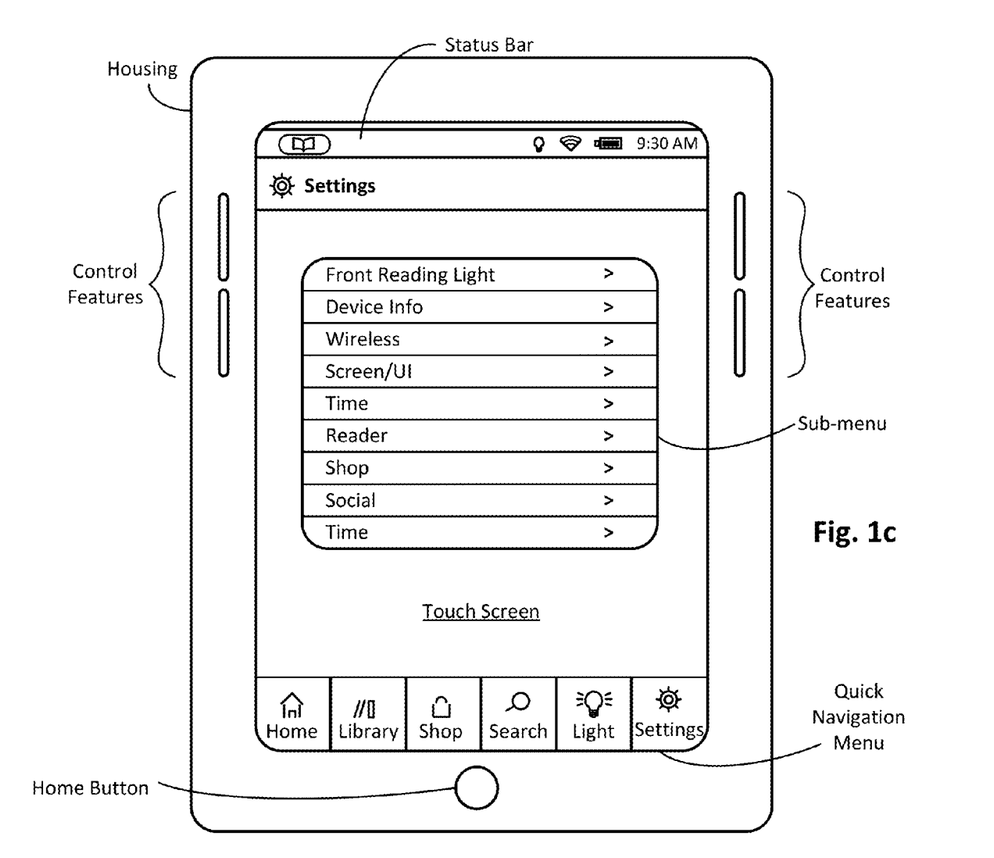
FIGS. 1c-d illustrate example configuration screen shots of the user interface of the electronic touch sensitive device shown in FIGS. 1a-b, configured in accordance with an embodiment of the present invention.
Figure 1D:
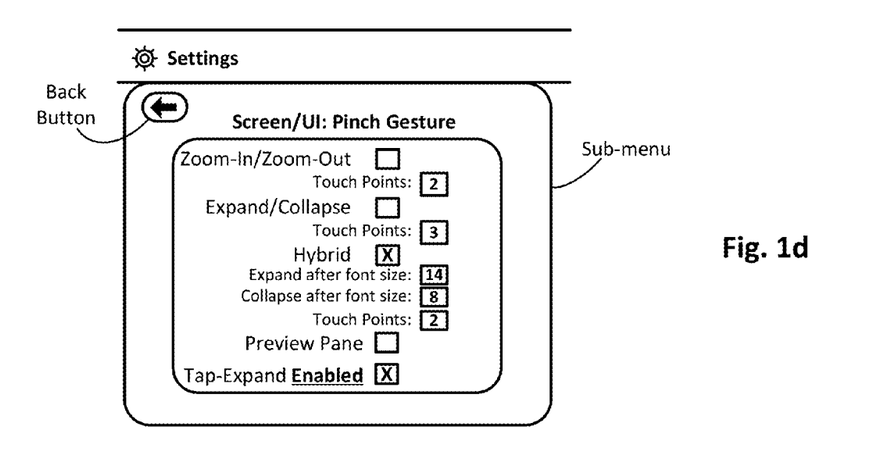

As previously explained, and with further reference to FIGS. 1c and 1d, once the Settings sub-menu is displayed (FIG. 1c), the user can then select the Screen/UI option. In response to such a selection, the pinch gesture configuration sub-menu shown in FIG. 1d can be provided to the user. The user can configure a number of features with respect to the pinch gesture, in this example embodiment. In more detail, by checking the Zoom-In/Zoom-Out check box, the user can select a function for a pinch gesture which enlarges the content displayed on the screen with an outward pinch and shrinks the content with an inward pinch. The user can specify the number of touch points in the pinch-based zoom gesture. Alternatively, or in addition, by checking the Expand/Collapse check box, the user can select a function for a pinch gesture which expands displayed content to include previously hidden content with an outward pinch, and collapses displayed content to hide currently displayed content with an inward pinch. Again, the user can specify the number of touch points in the pinch-based collapse/expand gesture. In one embodiment, the content that is displayed or hidden after a pinch-based collapse/expand gesture may be determined based upon the hierarchy or organizational structure of the content being displayed (e.g. book, section, chapter, sub-chapter). In one example scenario, the pinch gesture is assigned only to the Expand/Collapse function, and the zoom function is effectively disabled. Note, however, that both zoom and expand/collapse functions can be enabled if so desired, so long as the respective pinch gestures have a different number of touch points so they can be distinguished from one another (e.g., 2 touch points for zoom and 3 touch points for expand/collapse). Numerous configurations will be apparent in light of this disclosure.

In another example embodiment, the user may check the Hybrid check box to associate the pinch gesture with both a zooming and an expanding/collapsing function. In one such example case, an outward pinch gesture may zoom-in until the size of the displayed content reaches a certain upper boundary, while an inward pinch gesture may zoom-out until the size of the displayed content reaches a certain lower boundary. In addition, once the content has been enlarged up to the upper boundary size, any subsequent outward pinching motion or gestures may expand the content to display previously hidden material. Similarly, once the content has been shrunk to the lower boundary size, any subsequent inward pinching motion or gestures may collapse portions of the content on the screen. In one such example, the upper and lower boundaries of the content are determined by font sizes that may be selected in the configuration sub-menu, but in other embodiments these font size limits can be hard-coded. In the specific example shown in FIG. 1d, the Hybrid function is selected and the device is configured to zoom-in as large as font size 14, and then begin expanding hidden content. The device is further configured in this example to zoom-out as small as font size 8, and then begin collapsing the content on the screen.

Although the configuration of the Hybrid mode is described in relation to font sizes, the techniques described herein are not limited to text-based content. The same principles described above may be implemented with images, drawings, or other types of content. The techniques of expanding and collapsing content may be merged with the zoom function, or any other function, in a number of alternative ways. For instance, in one embodiment the pinch gesture may be associated with the zoom function, while the pinch gesture combined with pressing and holding one of the control features (shown in FIG. 1a) may be associated with the Expand/Collapse function.

In another example embodiment, the pinch gesture configuration sub-menu includes a UI check box that when checked or otherwise selected by the user, enables a 'Tap-Expand' function (shown in the enabled state); unchecking the box disables the function. In one example, the Tap-Expand function allows the user to designate a center point for the expansion or for the hybrid zoom-expansion function, depending upon which function(s) is assigned to the pinch gesture. In one example embodiment, the Tap-Expand function is enabled along with the Expand/Collapse function. In such an example, the user may initially tap or otherwise contact the touch screen display at a certain location, and within a specific time frame (e.g., 1-2 seconds) may contact the screen at another point to perform an inward or outward pinch gesture. The initial tap may identify which item or items should expand or collapse in response to the subsequent pinch gesture. For instance, in one embodiment the user may tap the touch screen at a certain location with the index or middle finger of the user's hand, thus selecting one or more items, and within one to three seconds the user may contact the screen with the thumb of the same hand and perform the outward pinch motion. In this example scenario, the gestures described may expand previously hidden content related to the item or items selected by the initial tap.

With further reference to the example embodiment of FIG. 1d, the pinch gesture configuration sub-menu may include a UI check box that when checked or otherwise selected by the user, enables a preview pane function (shown in the unselected state); unchecking the box disables the function. In such an example case, the preview pane may provide a preview of the expanded content that would be displayed after an outward pinch gesture has been detected by the touch screen device. The preview pane may be implemented with the tap-expand function, in one embodiment, such that a preview of the expanded content related to the identified item may be displayed.

In addition, a back button arrow UI control feature is provisioned on the touch screen, so that the user can go back to the Settings menu after the expand/collapse function has been configured, if so desired. While a number of user-configurable features are provided in some embodiments, other embodiments may have any combination of similar features wherein the features are set as a given default or are otherwise hard-coded, such that no user configuration is necessary.

Figure 2A:
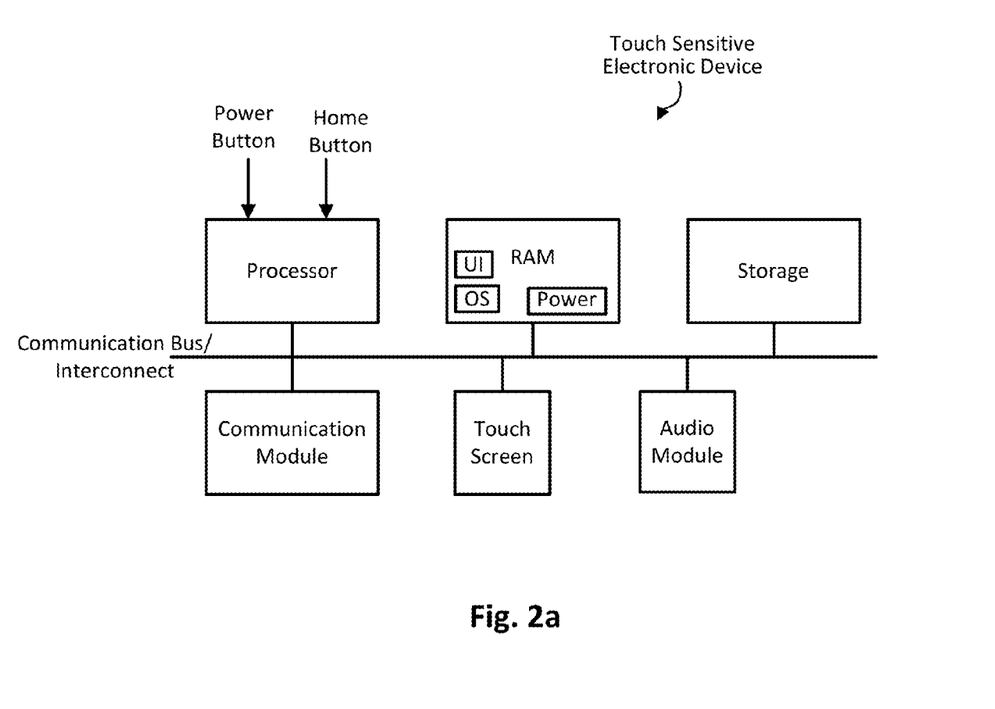
FIG. 2a illustrates a block diagram of an electronic touch sensitive device configured in accordance with an embodiment of the present invention.

FIG. 2a illustrates a block diagram of an electronic touch screen device configured in accordance with an embodiment of the present invention. As can be seen, this example device includes a processor, random access memory (RAM), additional storage/memory, a communications module, a touch screen, and an audio module. A communications bus and interconnect is also provided to allow inter-device communication. Other typical componentry and functionality not reflected in the block diagram will be apparent (e.g., battery, co-processor, etc). Further note that although a touch screen display is provided, other embodiments may include a non-touch screen and a touch sensitive surface such as a track pad, or a touch sensitive housing configured with one or more acoustic sensors, etc. In any such cases, the touch sensitive surface is generally capable of translating a user's physical contact with the surface into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the RAM includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having an expand/collapse function as described herein. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The RAM can be any suitable type of memory and size (e.g., 256 or 512 Mbytes SDRAM), and in other embodiments may be implemented with non-volatile memory or a combination of non-volatile and volatile memory technologies. The storage can also be implemented with any suitable memory and size (e.g., 2 GBytes of flash memory). The display can be implemented, for example, with a 6-inch E-ink Pearl 800×600 pixel screen with Neonode® zForce® touch screen, or any other suitable display and touch screen interface technology. The communications module can be, for instance, any suitable 802.11b/g/n WLAN chip or chip set, which allows for connection to a local network so that content can be downloaded to the device from a remote location (e.g., content provider, etc, depending on the application of the display device). In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc). The device may be smaller, for example, for smartphone and tablet applications and larger for smart computer monitor applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (UI) module can be, for example, based on touch screen technology and the various example screen shots shown in FIGS. 1a-d, 3a-d, 4a-c, and 5a-d in conjunction with the expand/collapse methodologies demonstrated in FIG. 6, which will be discussed in turn. The audio module can be configured, for example, to speak or otherwise aurally present a selected eBook table of contents or other textual content, if preferred by the user. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher).

Client-Server System

Figure 2B:
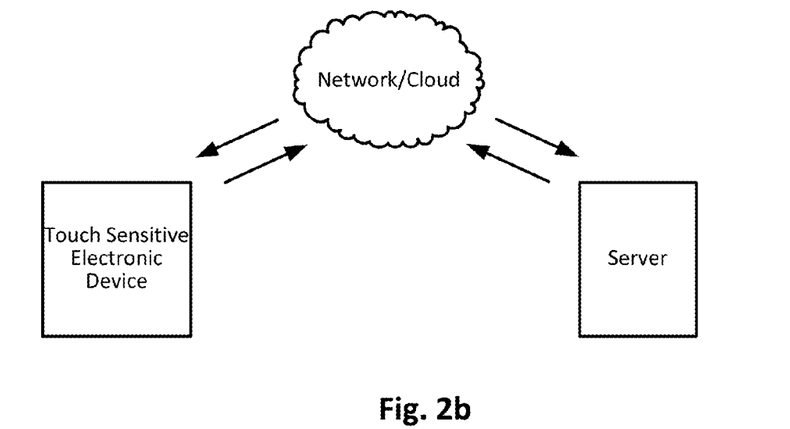
FIG. 2b illustrates a block diagram of a communication system including the electronic touch sensitive device of FIG. 2a, configured in accordance with an embodiment of the present invention.
Figure 3A:
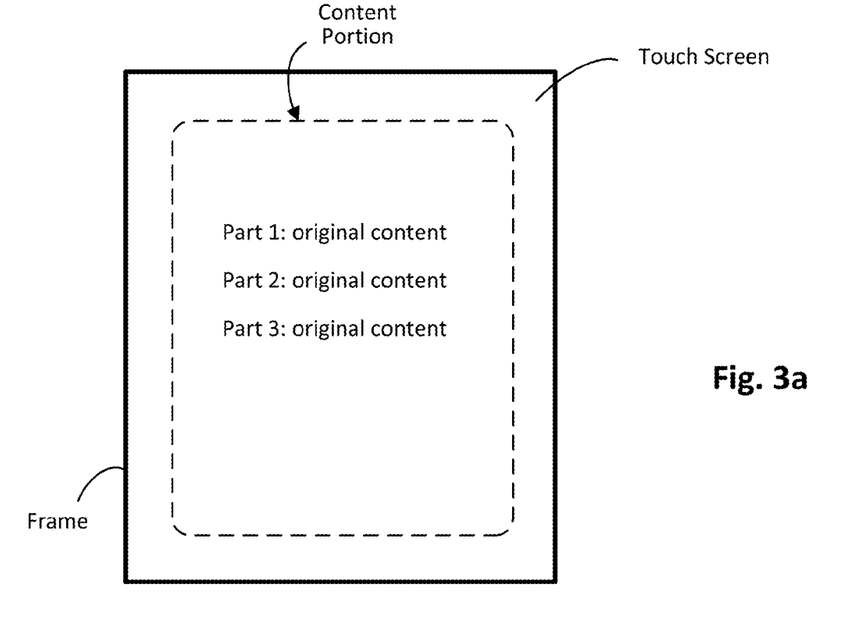
FIGS. 3a-d illustrate an example pinch-based expand and collapse function of an electronic touch sensitive device configured in accordance with an embodiment of the present invention
Figure 3B:
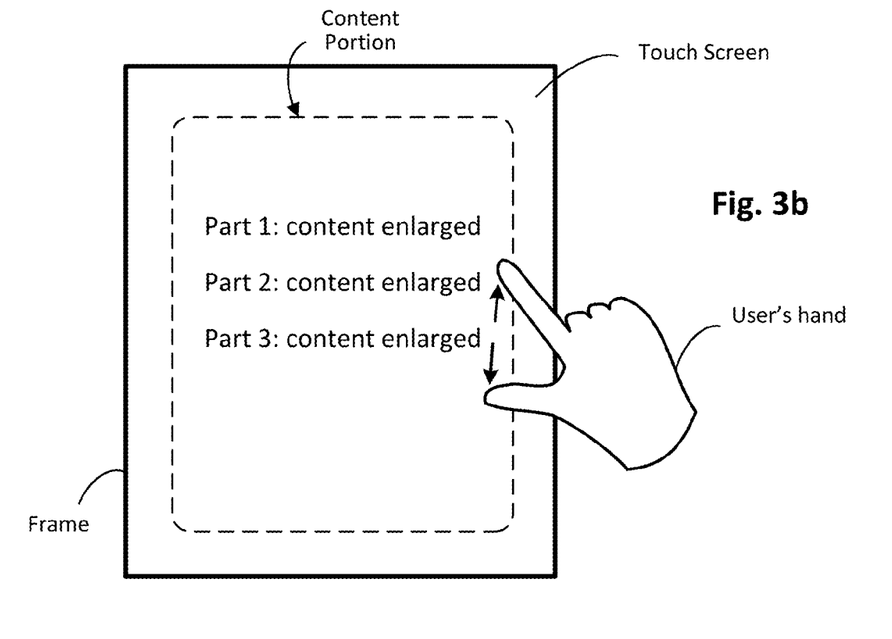
Figure 3C:
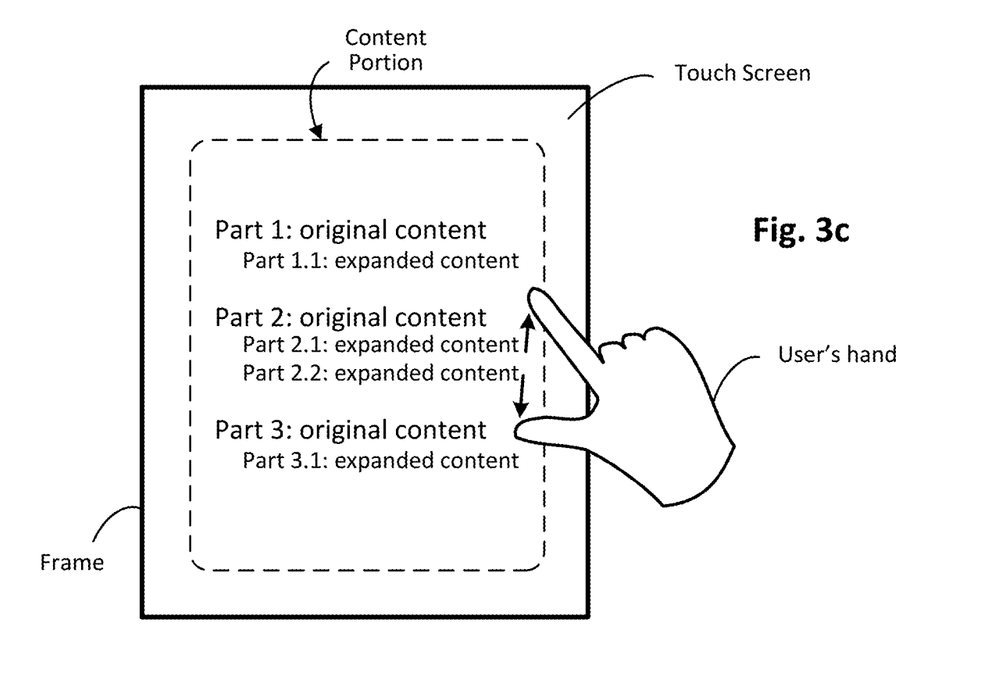
Figure 3D:
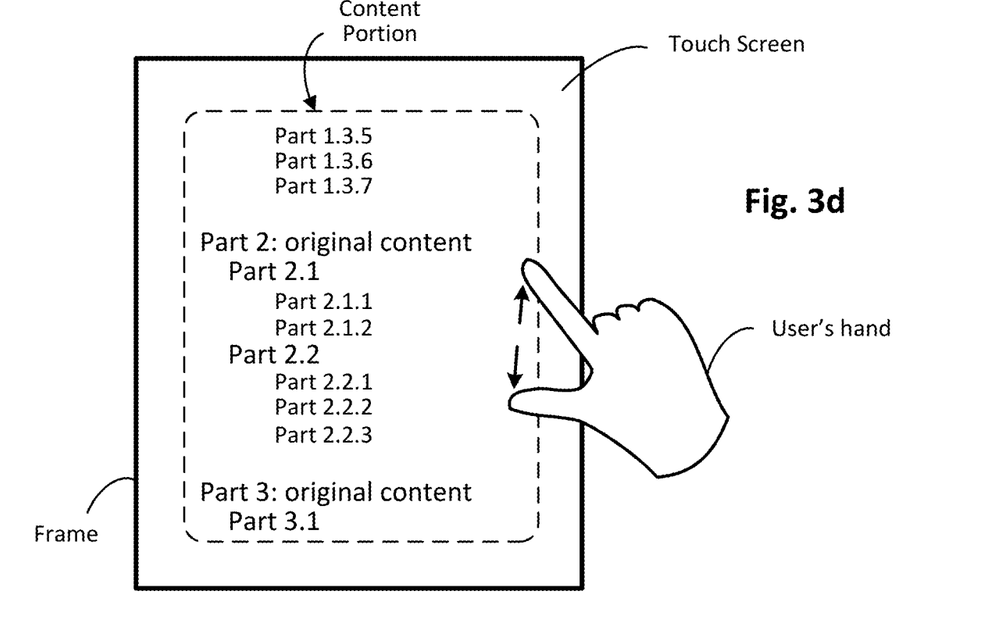

FIG. 2b illustrates a block diagram of a communication system including the electronic touch sensitive device of FIG. 1a, configured in accordance with an embodiment of the present invention. As can be seen, the system generally includes an electronic touch sensitive device that is capable of communicating with a server via a network/cloud. In this example embodiment, the electronic touch sensitive device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by providing the user with requested or otherwise recommended content. Is some such embodiments, the server is configured to remotely provision an expand/collapse UI feature as provided herein to the touch sensitive device (e.g., via JavaScript or other browser based technology). In other embodiments, portions of the methodology are executed on the server and other portions of the methodology are executed on the device. Numerous server-side/client-side execution schemes can be implemented, as will be apparent in light of this disclosure.

Methodologies

FIGS. 3a-d illustrate an example pinch-based expand and collapse function in Hybrid mode, in accordance with an embodiment of the present invention. As can be seen, the touch screen generally includes a content portion (within the dashed line area) within the touch screen. A physical frame or support structure is provided about the screen. In the example shown in FIG. 3a, the content portion is displaying parts 1-3 of the content on the screen. These parts could be, for example, sections of a table of contents having lower levels of information currently not being displayed (hidden). As can be seen with reference to FIG. 3b, because the Hybrid mode is enabled in this example case, the outward pinch gesture performed by the user zooms in on the original content being displayed on the screen. The multipoint outward pinch gesture may be performed using any two or more fingers (or other implements), zooming-in on the content until the text of parts 1-3 reaches a determined size. In another example embodiment, the zooming function may be performed with an outward pinch while pressing and holding on of the device's control features.

In any such Hybrid mode cases, once the desired zoom-in level (size) is achieved, the content expanding portion of the Hybrid mode gesture takes over in response to further outward pinch motion or gestures so as to reveal underlying or otherwise hidden content associated with the target content. For instance, after the desired zoom is reached, the expansion begins one level of information at a time. In such an example, the content being expanded and displayed may be determined based on the hierarchy or structure of the content being navigated. In the specific example shown in FIG. 3c, the outward pinch gesture expands Parts 1-3 by showing Parts 1.1, 2.1, 2.2, and 3.1, all of which were previously hidden. In a further example shown in FIG. 3d, a subsequent outward pinch gesture further expands the content by showing another set of more detailed content. Specifically, Parts 1.1.1-1.3.7, 2.1.1-2.1.2, and 2.2.1-2.2.3 are currently displayed in this example. The user may scroll up or down to view the newly expanded content if all of the content is not visible in the content portion of the device. Specifically in this example, the user could scroll up in order to see newly expanded Parts 1.1.1-1.3.4. Once the user has navigated to the screen displayed in FIG. 3d, in one example the user may perform the inward pinch gesture to collapse the newly displayed content and return to the screen displayed in FIG. 3c. In another example, the user may again collapse the expanded content to return to the original content shown in FIG. 3b.

Figure 4A:
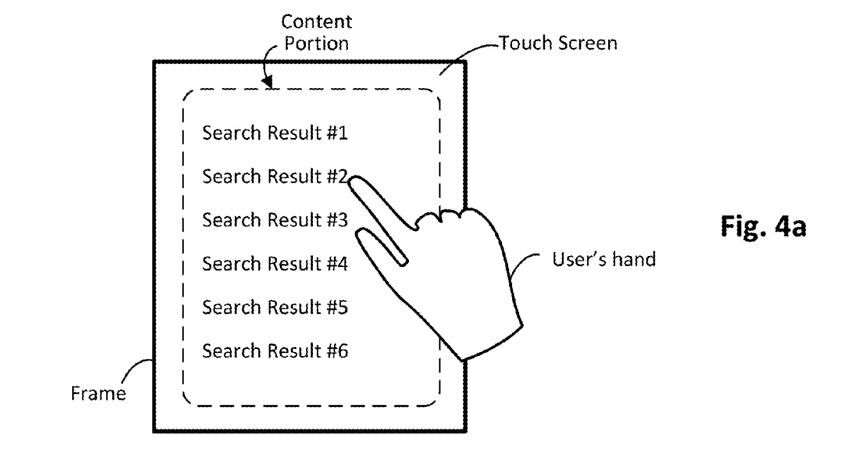
FIGS. 4a-c illustrate another example pinch-based expand and collapse function, configured in accordance with an embodiment of the present invention
Figure 4B:
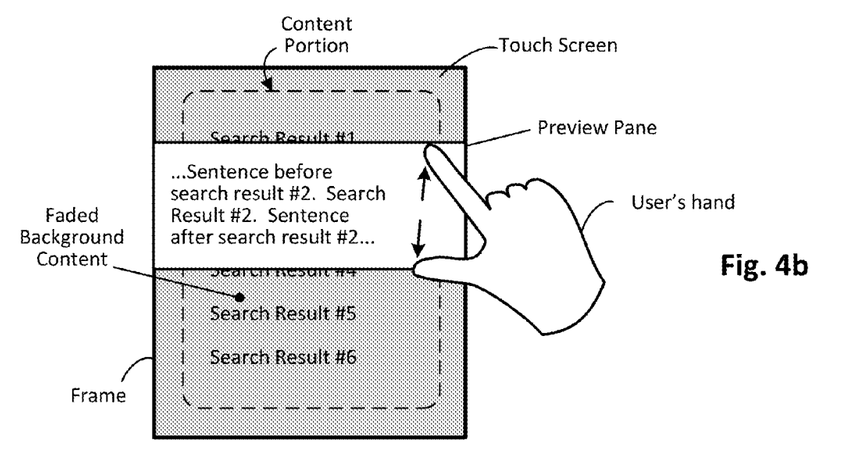
Figure 4C:
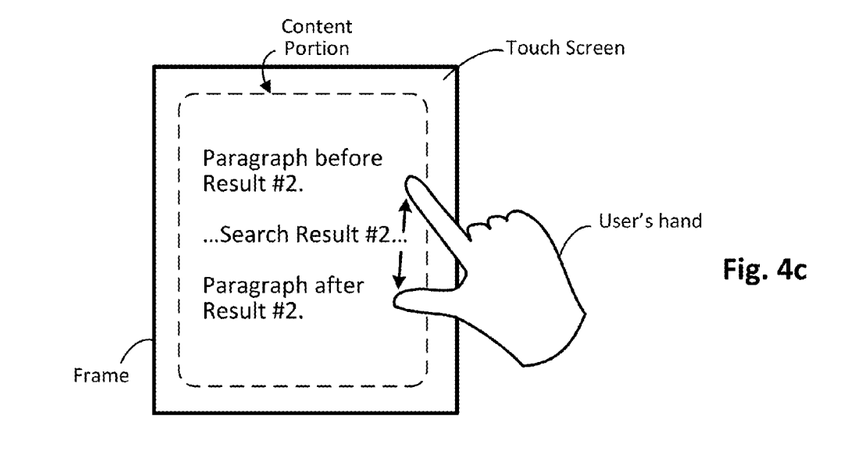

FIGS. 4a-c illustrate an example expand/collapse function including a preview pane, configured in accordance with an embodiment of the present invention. As can be seen, the content portion is displaying search results 1-6 on the screen. In one embodiment, these are results of a text search, wherein the content surrounding each search result is not currently displayed. In the example shown, the Tap-Expand function and preview pane function previously described with reference to FIG. 1d are both enabled. In this particular example, the user taps search result #2 and then performs the outward pinch gesture with thumb and index finger, providing the preview pane shown in FIG. 4b. Now the user is able to preview search result #2, along with samples of the content surrounding the search result. In particular, the sentence including search result #2, the sentence before result #2, and the sentence after result #2 are displayed in the preview pane in this example scenario. Note that the preview pane may be enlarged past the content portion of the device and the background content can be faded in order to make the preview pane more prominent, in this example embodiment. Once the preview pane has been accessed, the pane may expire after a few seconds (e.g., 3 to 10 seconds) and the device may again display the screen shown in FIG. 4a. Alternatively, the user may perform an inward pinch gesture and collapse the preview pane, returning to the screen shown in FIG. 4a. The home button or other control feature of the device may also be configured to collapse the preview pane and return to the screen shown in FIG. 4a. In the particular example scenario depicted, the user has determined that search result #2 is the result desired and performs an outward pinch gesture to display the source of search result #2, as shown in FIG. 4c.

Figure 5A:
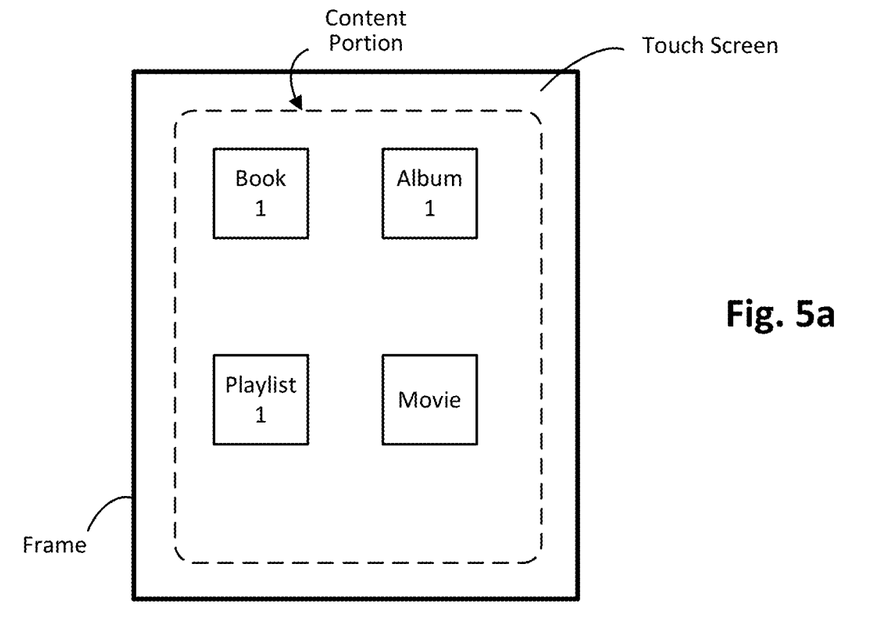
FIGS. 5a-d illustrate another example pinch-based expand and collapse function, configured in accordance with an embodiment of the present invention.
Figure 5B:
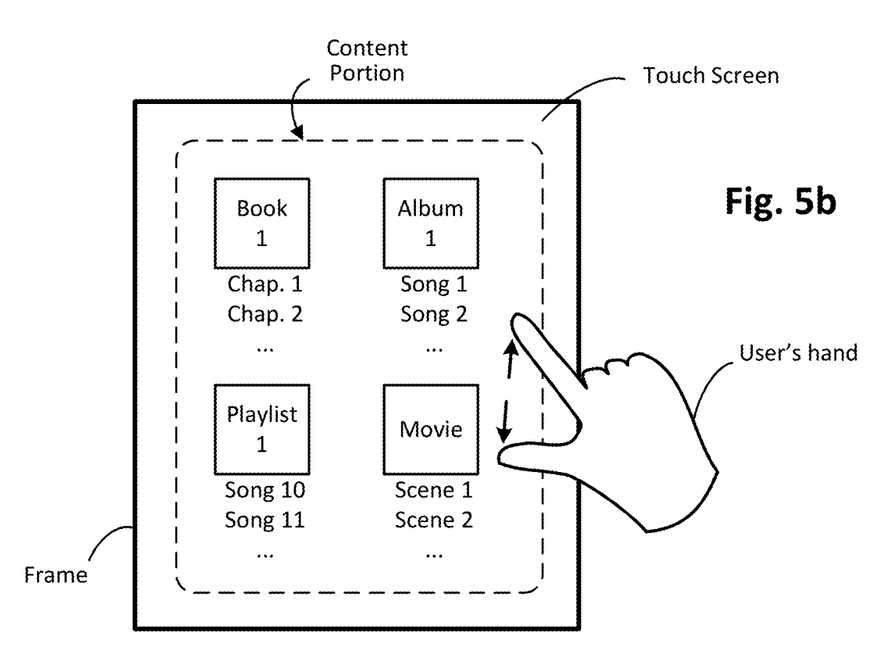

FIGS. 5a-d illustrate another example expand/collapse function, configured in accordance with one embodiment of the present invention. As can be seen, the content portion is displaying a number of media items on the screen, as shown in FIG. 5a. In this specific example, the items include a book, album, playlist, and movie. As can be further seen, the user performs an outward pinch gesture on the touch sensitive surface, thus expanding the content shown on the screen, as shown in FIG. 5b. Note that the pinch gesture is performed on a blank part of the content portion, and therefore acts globally on all content displayed. In other cases, the pinch gesture can be performed over a particular piece of displayed content, and will act exclusively on that piece of content.

Figure 5C:
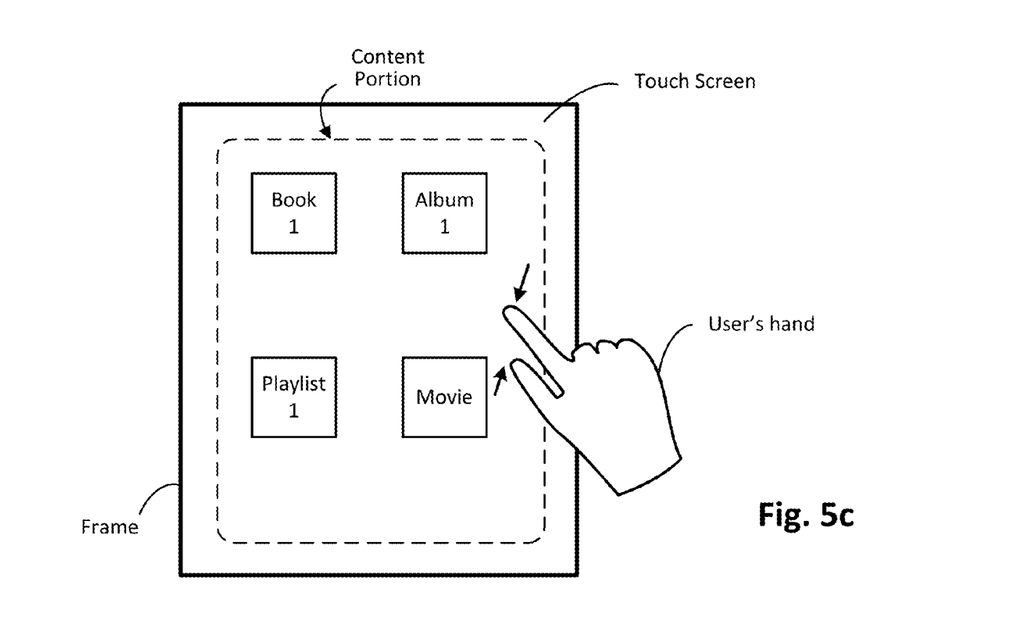
Figure 5D:
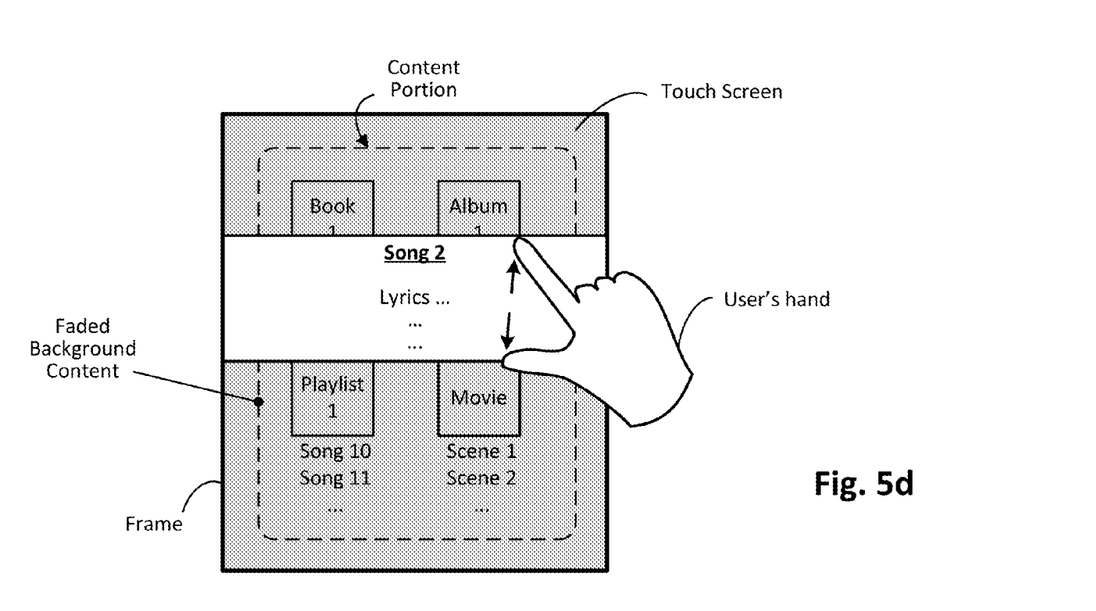

As can be further seen with reference to FIG. 5b, beneath the book, album, playlist, and movie, different chapters, songs, and scenes are now visible that were previously hidden. In one example embodiment, the user may select one of the songs on now displayed on the screen in order to play the song, or select one of the scenes to begin viewing the scene in the case of a movie. In another embodiment, the user may perform the inward pinch gesture to collapse the newly displayed content, as shown in FIG. 5c, thereby returning to the view without the hidden content displayed. In yet another example embodiment, the user may perform the tap-expand gesture (as previously described in reference to FIG. 4b) on song 2 in order to view the song lyrics, as shown in FIG. 5d. In one such example, the song lyrics may be displayed in a preview pane similar to that described in reference to FIG. 4b. Alternatively, the user may perform the tap-expand gesture on one of the book chapters or scenes in order to preview additional hidden content relating to those particular items.

Figure 6:
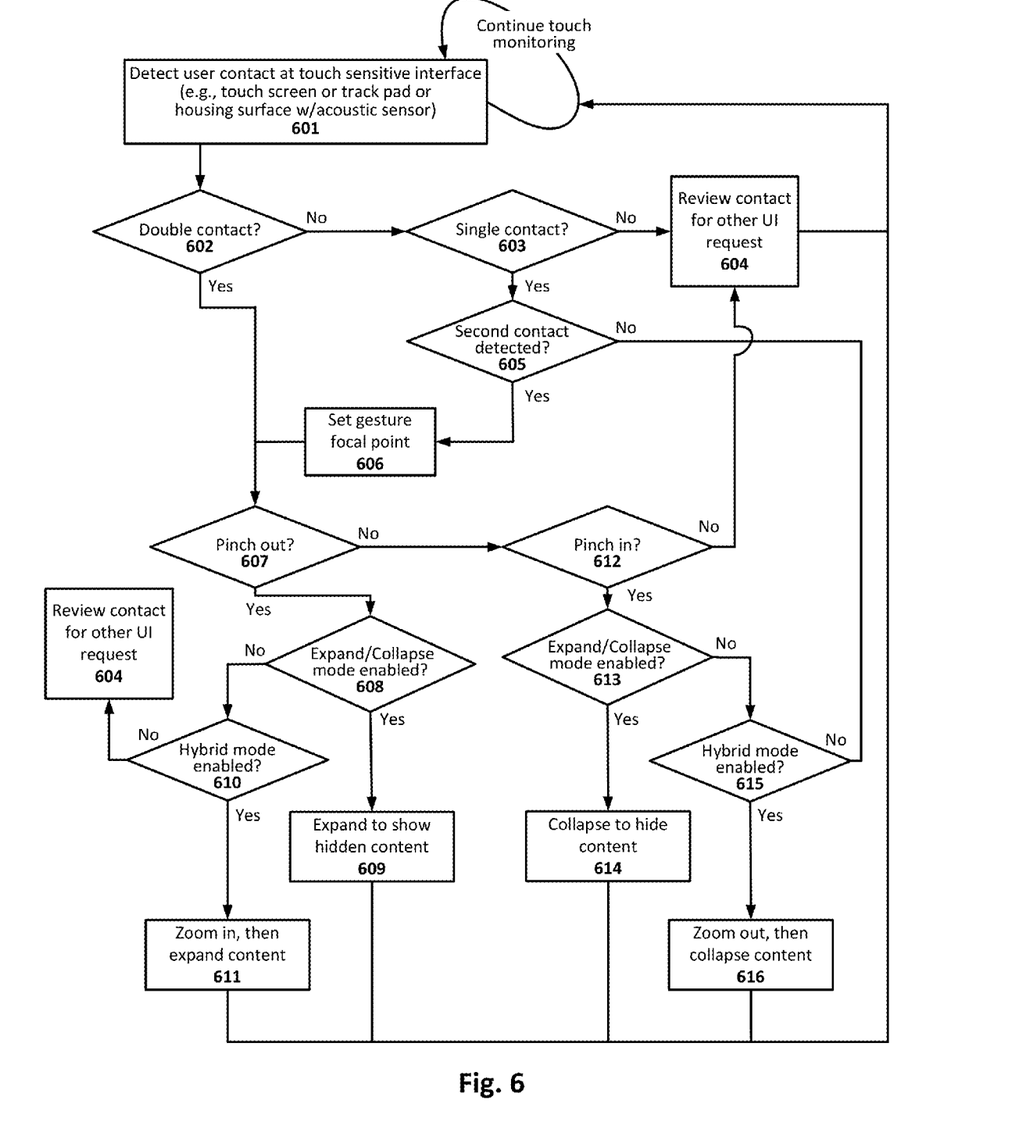
FIG. 6 illustrates a method for expanding and collapsing content in an electronic touch sensitive device, in accordance with an embodiment of the present invention.

FIG. 6 illustrates a method for expanding and collapsing content in response to pinch-based gestures in an electronic touch screen device, in accordance with an embodiment of the present invention. This example methodology may be implemented, for instance, by the UI module of the touch sensitive device shown in FIG. 2a, or the touch sensitive device shown in FIG. 2b (e.g., with the UI provisioned to the client by the server). To this end, the UI can be implemented in software, hardware, firmware, or any combination thereof, as will be appreciated in light of this disclosure.

In general, any touch sensitive device may be used to detect contact with it by one or more fingers and/or styluses. As soon as the user begins to drag or otherwise move the contact points, the UI code (and/or hardware) can assume a drag gesture has been engaged and track the path of each contact point with respect to any fixed point within the touch surface until the user stops engaging the touch sensitive surface. The release point can also be captured by the UI as it may be used to commit the action started when the user pressed on the touch sensitive surface. In a similar fashion, if the user releases hold without moving the contact point, a press or press-and-hold command may be assumed depending on the amount of time the user was continually pressing on the touch sensitive surface. These main detections can be used in various ways to implement UI functionality.

In this example case, the method includes detecting 601 user contact at the touch sensitive interface. In general, the touch monitoring is effectively continuous. The method continues with determining 602 if the contact is a double contact or not. If no double contact is detected, the method may continue with determining 603 if there was a single contact. If no single contact is detected, the contact may be reviewed 604 for other possible UI requests. If a single contact is detected, the method may continue with monitoring 605 if a second contact is detected. If no second contact is detected within a determined period of time (e.g., 1-2 seconds), the initial contact may be reviewed 604 for other possible UI requests. If a second contact is detected, then the focal point of the gesture may be set 606 based on the location of the initial single contact. The method may then continue with determining 607 if an outward pinch gesture is detected. Likewise, if a double contact is detected at 602, the method may also continue with determining 607 if an outward pinch gesture is detected.

If an outward pinch gesture is detected at 607, the method may continue with determining 608 if the expand/collapse mode is enabled or otherwise hard-coded. If enabled, the outward pinch gesture may be associated with an expand function, and the method may continue with expanding 609 hidden content. In one embodiment, the previously hidden content may be expanded one level of information at a time, depending on the outline or organizational structure of the content being consumed. If the expand/collapse mode is not enabled, the method may continue by determining 610 if the hybrid zoom and expand/collapse mode is enabled. If this mode is not enabled, the method may continue with reviewing 604 the contact for other UI requests.

If the hybrid mode is enabled, the method may continue 611 with zooming-in on the content displayed on the screen and then expanding hidden content. As described above, in one embodiment the hybrid mode may involve zooming-in until a certain font size is reached, or until an image has doubled in size. In such an embodiment, after the content has been zoomed-in, any subsequent outward pinching gestures may expand content that was previously hidden. In one such embodiment, the content may be expanded one level at a time with each outward pinch gesture. In another example embodiment, the zoom function may be associated with a simple outward pinch gesture, while the expand function may be associated with an outward pinch accompanied by holding one of the control features of the device or an otherwise distinguishable number of touch points. Numerous other gestures and configurations will be apparent in light of this disclosure.

If an outward pinch gesture is not detected 607, the method may continue with determining 612 if an inward pinch gesture is detected. If no inward pinch gesture is detected, the gesture may be reviewed 604 for other UI requests. If an inward pinch gesture is detected, the method may continue with determining 613 whether the expand/collapse mode is enabled. If the expand/collapse mode is enabled, the inward pinch gesture may be associated with the collapse function, and the method may continue with collapsing 614 to hide content. In one embodiment, the content may be collapsed one level of information at a time, depending on the outline or organizational structure of the content being consumed. If the expand/collapse mode is not enabled, the method may continue by determining 615 if the hybrid zoom and expand/collapse mode is enabled. If this mode is not enabled, the method may continue with reviewing 604 the contact for other UI requests.

If the hybrid mode is enabled, the method may continue 616 with zooming-out the content displayed on the screen and then collapsing content. As described above, in one embodiment the hybrid mode may involve zooming-out until a certain font size is reached, or until an image has decreased to a certain size. In such an embodiment, after the content has been zoomed-out to the determined level, any subsequent inward pinching gestures may collapse content. In one such embodiment, the content may be collapsed one level at a time with each inward pinch gesture. In another example embodiment, the zoom function may be associated with a simple inward pinch gesture, while the collapse function may be associated with an inward pinch accompanied by holding one of the control features of the device. Numerous other gestures and configurations will be apparent in light of this disclosure. As can be further seen, the method includes continuously monitoring the touch sensitive surface for contact and movement.

Numerous variations and configurations will be apparent in light of this disclosure. For example, one example embodiment provides a device that includes a display for displaying content to a user, and a touch sensitive surface for allowing user input. The device further includes a user interface including an expand/collapse mode configured to reveal or hide information relating to content currently shown on the display in response to user contact including a multipoint pinch gesture. In some cases, the display is a touch screen display that includes the touch sensitive surface. In some cases, the touch sensitive surface is a track pad. In some cases, the expand/collapse mode is configured to hide currently displayed content in response to an inward multipoint pinch gesture, and to reveal currently hidden content in response to an outward multipoint pinch gesture. In some cases, the user contact further includes an initial single contact to select one or more items, followed by an inward or outward pinch gesture with at least one more contact point. In some cases, the information includes at least one of: a section of a book, an item within an index, a scene of a video, a section of an article, a song of a playlist, lyrics of a song, and content surrounding a search result. In some cases, the user contact further includes pressing one or more control features of the device. In some cases, the expand/collapse mode is configured to engage a zoom function as well as the expand/collapse function in response to the multipoint pinch gesture. In some such cases, the expand/collapse mode is configured to zoom the content currently shown on the display until an upper or lower content size limit is reached, before engaging the expand/collapse mode. In some cases, the expand/collapse mode includes a preview pane.

Another example embodiment provides a device that includes a display having a touch screen interface and for displaying content to a user, and a user interface including an expand/collapse mode for revealing or hiding information relating to content currently shown on the display in response to user contact via the touch screen interface, the user contact including a multipoint pinch gesture. In some cases, the expand/collapse mode is configured to hide currently displayed content in response to an inward multipoint pinch gesture, and to reveal currently hidden content in response to an outward multipoint pinch gesture. In some cases, the user contact includes an initial single contact to select one or more items shown on the display, followed by an inward or outward pinch gesture with at least one more contact point. In some cases, the information includes at least one of: a section of a book, an item within an index, a scene of a video, a section of an article, a song of a playlist, lyrics of a song, and content surrounding a search result. In some cases, the user contact further includes pressing one or more control features of the device. In some cases, the expand/collapse mode includes a preview pane. In some cases, the device is an eReader device or a tablet computer or a smartphone or other such mobile computing device.

Another example embodiment provides a device that includes a computer readable medium encoded with instructions that when executed by one or more processors, cause a process to be carried out. The process includes, in response to user contact including a multipoint pinch gesture, revealing or hiding information relating to currently displayed content. In some cases, the process is configured to hide currently displayed content in response to an inward multipoint pinch gesture, and to reveal currently hidden content in response to an outward multipoint pinch gesture. In some cases, the user contact includes an initial single contact to select one or more items shown on the display, followed by an inward or outward pinch gesture with at least one more contact point.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A device for displaying content containing multiple levels of information including one or more lower levels of information that can be hidden so as to not be displayed, comprising:
   a display for displaying the content to a user;
   a touch sensitive surface for allowing user input; and
   a user interface including an expand/collapse mode configured to reveal or hide lower level information relating to displayed content in response to user contact including a multipoint pinch gesture;
   wherein if the pinch gesture is performed over a particular piece of displayed content associated with lower level information, the expand/collapse mode exclusively reveals or hides lower level information for that particular piece of displayed content; and
   wherein if the pinch gesture is not performed over a particular piece of displayed content associated with lower level information, the expand/collapse mode globally reveals or hides lower level information for all of the displayed content associated with lower level information.

2. The device of claim 1 wherein the display is a touch screen display that includes the touch sensitive surface.

3. The device of claim 1 wherein the touch sensitive surface is a track pad.

4. The device of claim 1 wherein only one level of lower level information is revealed or hidden in response to the user contact.

5. The device of claim 1 wherein the user contact further includes an initial single contact to select one or more items, followed by an inward or outward pinch gesture with at least one more contact point.

6. The device of claim 1 wherein the lower level information includes at least one of: a section of a book, an item within an index, a scene of a video, a section of an article, a song of a playlist, lyrics of a song, and content surrounding a search result.

7. The device of claim 1 wherein the user contact further includes pressing one or more control features of the device.

8. The device of claim 1 wherein an outward multipoint pinch gesture causes a zoom-in function until a size of the displayed content reaches an upper content size limit, and once the content has been enlarged up to the upper content size limit, a subsequent outward multipoint pinch gesture expands the displayed content to reveal at least one level of previously hidden lower level information, and an inward multipoint pinch gesture causes a zoom-out function until the size of the displayed content reaches a lower content size limit, and once the content has been shrunken down to the lower content size limit, a subsequent inward multipoint pinch gesture collapses the displayed content to hide at least one level of previously displayed lower level information.

9. The device of claim 8 wherein the expand/collapse mode is user-configurable, such that at least one of the following is user-configurable:
   functional response to pinch gesture including expand/collapse function, zoom-in/zoom-out function, or both functions so as to provide a hybrid mode;
   number of points in the pinch gesture; and
   the upper and lower content size limits.

10. The device of claim 1 wherein the expand/collapse mode includes a preview pane and the preview pane is displayed in response to an initial multipoint outward pinch gesture with respect to content currently displayed and selected, so as to provide a preview of hidden content that would be displayed after a subsequent multipoint outward pinch gesture, the hidden content associated with the selected content.

11. A device for displaying content containing multiple levels of information including one or more lower levels of information that can be hidden so as to not be displayed, comprising:

a display having a touch screen interface and for displaying the content to a user; and a user interface including an expand/collapse mode configured to reveal or hide lower level information relating to displayed content in response to user contact via the touch screen interface, the user contact including a multipoint pinch gesture;

wherein if the pinch gesture is performed over a particular piece of displayed content associated with lower level information, the expand collapse mode exclusively reveals or hides lower level information for that particular piece of displayed content;

wherein if the pinch gesture is not performed over a particular piece of displayed content associated with lower level information, the expand/collapse mode globally reveals or hides lower level information for all of the displayed content associated with lower level information; and wherein only one level of lower level information is revealed or hidden in response to the user contact.

12. The device of claim 11 wherein the expand/collapse mode is configured to hide lower level information in response to an inward multipoint pinch gesture, and to reveal lower level information in response to an outward multipoint pinch gesture.

13. The device of claim 11 wherein the user contact includes an initial single contact to select one or more items shown on the display, followed by an inward or outward pinch gesture with at least one more contact point.

14. The device of claim 11 wherein the lower level information includes at least one of: a section of a book, an item within an index, a scene of a video, a section of an article, a song of a playlist, lyrics of a song, and content surrounding a search result.

15. The device of claim 11 wherein the user contact further includes pressing one or more control features of the device.

16. The device of claim 11 wherein a preview pane is displayed in response to an initial multipoint outward pinch gesture with respect to content currently shown and selected, so as to provide a preview of hidden content that would be displayed after a subsequent multipoint outward pinch gesture, the hidden content associated with the selected content.

17. The device of claim 11 wherein the device is an eReader device or a tablet computer or a smartphone.

18. A non-transitory computer readable medium encoded with instructions that when executed by one or more processors, cause a process to be carried out for displaying content containing multiple levels of information including one or more lower levels of information that can be hidden so as to not be displayed, the process comprising:

cause display of the content to a user;

in response to user contact including a multipoint pinch gesture performed over a particular piece of displayed content associated with lower level information, reveal or hide lower level information exclusively for that particular piece of displayed content; and in response to user contact including a multipoint pinch gesture not performed over a particular piece of displayed content associated with lower level information, reveal or hide lower level information globally for all of the displayed content associated with lower level information.

19. The computer readable medium of claim 18 wherein only one level of lower level information is revealed or hidden in response to the user contact.

20. The computer readable medium of claim 18 wherein the process further comprises cause a preview pane to be displayed in response to an initial multipoint outward pinch gesture with respect to content currently shown and selected, so as to provide a preview of hidden content that would be displayed after a subsequent multipoint outward pinch gesture, the hidden content associated with the selected content.

\* \* \* \* \*